United States Patent
Wisbauer

(10) Patent No.: US 10,493,956 B2
(45) Date of Patent: Dec. 3, 2019

(54) CONTROL DEVICE AND METHOD FOR UNLOCKING A MOTOR VEHICLE WITH INTEGRATED NFC-CONTROL DEVICE

(71) Applicant: AUDI AG, Ingolstadt (DE)

(72) Inventor: Johannes Wisbauer, Gaimersheim (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/324,242

(22) PCT Filed: Jun. 23, 2017

(86) PCT No.: PCT/EP2017/065554
§ 371 (c)(1),
(2) Date: Feb. 8, 2019

(87) PCT Pub. No.: WO2018/028866
PCT Pub. Date: Feb. 15, 2018

(65) Prior Publication Data
US 2019/0217817 A1    Jul. 18, 2019

(30) Foreign Application Priority Data
Aug. 8, 2016  (DE) .................. 10 2016 214 674

(51) Int. Cl.
*B60R 25/10* (2013.01)
*B60R 25/24* (2013.01)
(52) U.S. Cl.
CPC .......... *B60R 25/245* (2013.01); *B60R 25/24* (2013.01); *B60R 25/241* (2013.01); *B60R 2325/103* (2013.01); *B60R 2325/205* (2013.01)

(58) Field of Classification Search
CPC .............. B60R 25/245; B60R 25/241; B60R 2325/103; B60R 2325/205; B60R 25/10
See application file for complete search history.

(56) References Cited

U.S. PATENT DOCUMENTS

| 9,162,648 B1 | 10/2015 | Weng et al. | |
| 9,855,918 B1* | 1/2018 | Melaragni | B60R 25/01 |
| 2008/0061964 A1* | 3/2008 | Yoshida | B60R 25/04 340/539.19 |
| 2010/0161720 A1* | 6/2010 | Colligan | G06Q 30/02 709/203 |

(Continued)

FOREIGN PATENT DOCUMENTS

| CN | 103688294 A | 3/2014 |
| CN | 103770749 A | 5/2014 |

(Continued)

OTHER PUBLICATIONS

Examination Report dated Mar. 3, 2017 of corresponding German application No. 10 2016 214 674.2; 14 pages.

(Continued)

*Primary Examiner* — Phung Nguyen
(74) *Attorney, Agent, or Firm* — Maier & Maier, PLLC

(57) ABSTRACT

A method for operating a motor vehicle, in which a locking state of a locking system of the motor vehicle is changed as soon as it is detected that a mobile terminal device that includes an NFC chip and contains a preset code in a memory unit is located within the transmitting and receiving area of an NFC control unit integrated in the motor vehicle.

4 Claims, 1 Drawing Sheet

(56) References Cited

U.S. PATENT DOCUMENTS

| | | | |
|---|---|---|---|
| 2014/0114504 A1 | 4/2014 | Yamashita et al. | |
| 2014/0129054 A1 | 5/2014 | Huntzicker et al. | |
| 2014/0172192 A1 | 6/2014 | Kato | |
| 2014/0242971 A1* | 8/2014 | Aladenize | G07B 15/00 455/420 |
| 2015/0314756 A1 | 11/2015 | Moenig et al. | |

FOREIGN PATENT DOCUMENTS

| | | |
|---|---|---|
| CN | 103810825 A | 5/2014 |
| CN | 104870267 A | 8/2015 |
| DE | 10 2010 061 111 A1 | 6/2012 |
| DE | 10 2012 107 000 A1 | 2/2014 |
| DE | 10 2013 221 116 A1 | 4/2014 |
| DE | 10 2013 222 332 A1 | 5/2014 |
| DE | 10 2013 221 962 A1 | 4/2015 |
| DE | 10 2014 104 032 A1 | 9/2015 |
| DE | 10 2014 107 186 A1 | 11/2015 |
| EP | 2 381 392 A1 | 10/2011 |
| EP | 2 860 071 A1 | 4/2015 |

OTHER PUBLICATIONS

International Search Report and Written Opinion of the International Searching Authority dated Sep. 12, 2017 in corresponding International application No. PCT/EP2017/065554; 26 pages including.

International Preliminary Report on Patentability dated Feb. 26, 2018 in corresponding International application No. PCT/EP2017/065554; 22 pages.

Office Action dated Apr. 16, 2019 in corresponding Korean Application No. 10-2019-7006613; 13 pages including English-language translation.

Kamouaa, Jedidi; "Turn-Key Passive Entry/Passive Start Solution", Automotive Compilation, vol. 10, 2013, pp. 29-35.

English-language translation of international preliminary report on patentability dated Feb. 14, 2019 in corresponding International Application No. PCT/EP2017/065554; 5 pages.

Office Action dated Jul. 24, 2019, in corresponding Chinese Application No. 201780048974.9; 13 pages.

Office Action dated Jul. 19, 2019, in corresponding Korean Application No. 10-2019-7006613; 8 pages.

\* cited by examiner

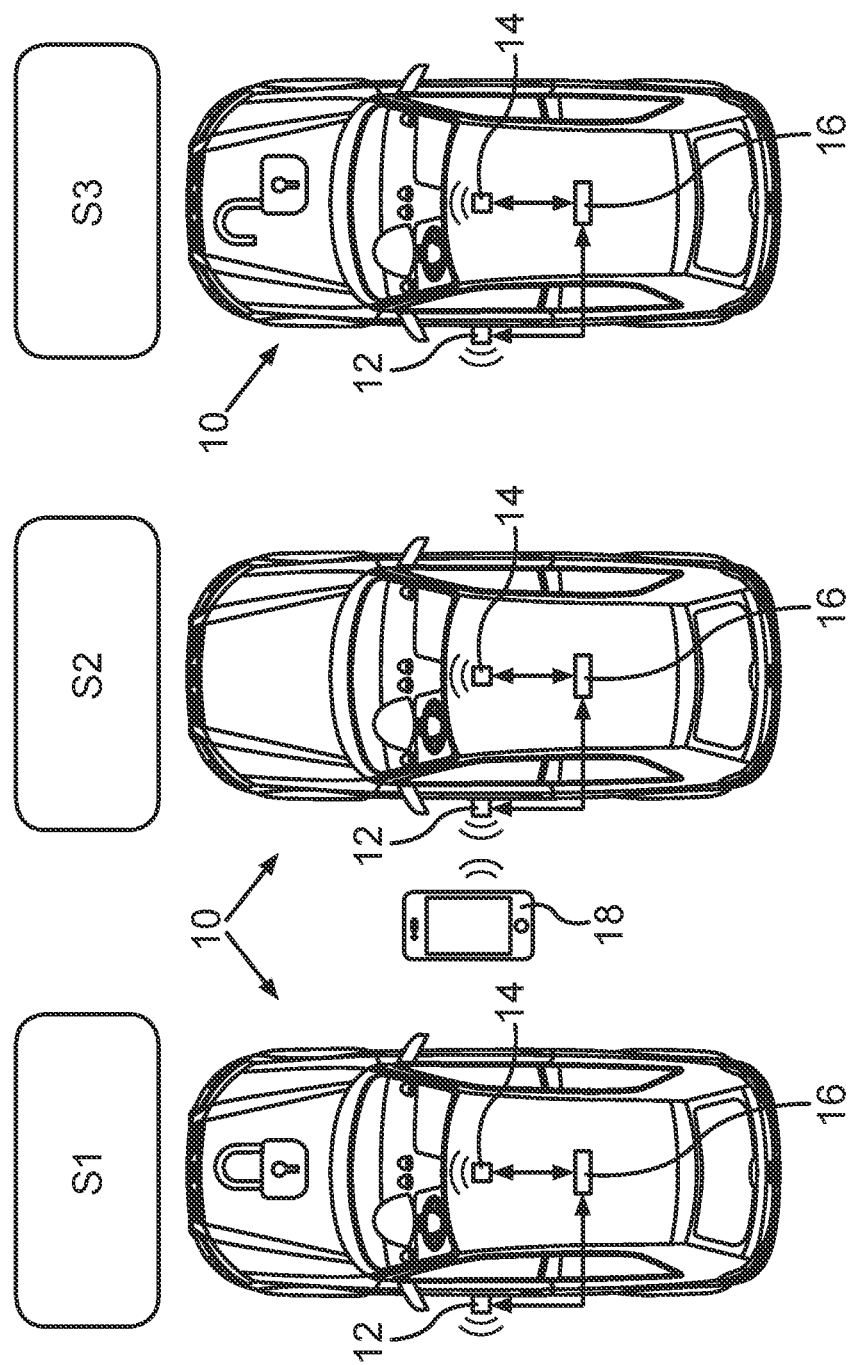

CONTROL DEVICE AND METHOD FOR UNLOCKING A MOTOR VEHICLE WITH INTEGRATED NFC-CONTROL DEVICE

FIELD

The invention relates to a method for operating a motor vehicle and a control device for operating a motor vehicle. The invention further relates to a motor vehicle equipped with such a control device.

BACKGROUND

To gain vehicle access, i.e. to unlock a vehicle, a remote key with or without a keyless entry function or an emergency key that still has a conventional key bit is typically used. In either case, unlocking and/or locking of a vehicle door is triggered by a deliberate action performed by a user. With a remote key without keyless entry function, the user presses an unlock button to unlock the motor vehicle or presses a lock button to lock the motor vehicle. When a remote key with the so-called keyless entry function is used, it is sufficient for the user to carry the remote key with him and to touch a sensor surface typically located near the inner surface of a door handle in order to unlock the motor vehicle. When he wishes to lock the motor vehicle again, it is usually sufficient for a user carrying the remote key with keyless entry function to touch a sensor surface located on the outer or upper side of a door handle.

DE 10 2010 061 111 A1 discloses a method in which an operator can use a mobile communication terminal device to activate a motor vehicle locking system, for example to unlock or lock a door of a motor vehicle. For this purpose, it is necessary only for the user to actuate a specific combination of keys on the mobile communication device or to select an element displayed on a screen of the communication device. Thus, the user must actively perform an action on the mobile communication device in order to unlock or lock a motor vehicle.

DE 10 2012 107 000 A1 discloses a method in which a user can use his smartphone to unlock a motor vehicle. In that case, an NFC connection is established between the smartphone and an ID encoder module, as a result of which the smartphone receives an authentication code. The actual unlocking of the motor vehicle takes place via a cellular connection established between the vehicle and the smartphone. This makes it possible to unlock or lock the motor vehicle even from very long distances.

DE 10 2014 107 186 A1 discloses a modular unit having an interface for a communication device, such as a smartphone. The modular unit is therefore a type of adapter which can be attached to the communication device. When the modular unit is held near a vehicle-side communication module, it receives a wake-up signal from a security system of the vehicle. The wake-up signal is transmitted from the modular unit to the communication device, which then transmits a response signal to the security system of the motor vehicle. The transmission of the wake-up signal can be initiated, for example, by the detection of the approach of an operator toward the vehicle by means of a proximity sensor, which is located in an exterior door handle.

SUMMARY

The object of the present invention is to provide a technical solution by means of which a motor vehicle can be operated in a particularly simple manner by keyless operation.

This object is attained by a method for operating a motor vehicle and by a control device for operating a motor vehicle.

In the method according to the invention for operating a motor vehicle, the locking state of a locking system of the motor vehicle is changed as soon as it is detected that a mobile terminal device that includes an NFC chip and contains a preset code in a memory unit is located within the transmitting and receiving area of an NFC control unit integrated in the motor vehicle. The NFC control unit may be integrated, e.g., in the region of an exterior door handle of the motor vehicle. It does not necessarily have to be the door handle. The NFC control units that serve as NFC readers could also be integrated into the B-pillar or the windshield.

The mobile terminal device may be a smartphone, a conventional mobile phone, a smartwatch, or even a smartcard, for example. Generally any terminal device that is NFC-capable and offers a secure storage and execution environment, known as a secure element, is suitable. A fitness wristband, for example, would also be suitable. If the mobile terminal device is a smartphone, for example, the method according to the invention offers the advantage that the smartphone, which is typically always on hand anyway, can be used to operate the motor vehicle, in particular to unlock or lock it. Thus, a user no longer needs to carry a vehicle key with him in order to activate the locking system of the motor vehicle. Instead, it is fully sufficient for the user to carry said mobile terminal device with him and to position it within the transmitting and receiving area of the NFC control unit integrated, for example, in the region of the exterior door handle of the motor vehicle.

As soon as this occurs, an NFC connection is established between the mobile terminal device, more specifically between the NFC chip integrated in the mobile terminal device, and the NFC control unit. The NFC chip and the NFC control unit then perform an authentication, in which the code stored in the memory unit of the mobile terminal device is preferably exchanged. In principle, however, upon accessing the vehicle, preferably no code is exchanged at first. This involves a challenge-response authentication based upon a shared secret or code with symmetric encryption. However, an asymmetric encryption method would also be conceivable here. Upon starting the vehicle, an additional or different code in encrypted form is then transmitted.

This memory unit is what is known as a secure element, which is a tamper-resistant platform for storing data. Once the authorization of the user in question has been established based upon the exchanged code, the locking state of the locking system of the motor vehicle is changed. This means that the locking system of the motor vehicle is either locked or unlocked, depending upon whether it is in a locked or an unlocked state. Thus, when the user holds his NFC-enabled terminal device in the form of the mobile terminal device up to the door handle of the motor vehicle and the vehicle is locked, the vehicle will be unlocked, and vice versa. The solution according to the invention therefore provides a particularly simple option for activating a locking system of a motor vehicle by means of a mobile terminal device.

One advantageous embodiment of the invention provides that the state of at least one additional functional unit of the motor vehicle is changed according to a preconfigured selection in the mobile terminal device as soon as it is detected that the mobile terminal device is located within the transmitting and receiving area of the NFC control unit, i.e. of the NFC control unit integrated in the region of the exterior door handle of the motor vehicle. It is therefore possible for the user to preconfigure, for example by means of an app installed on the mobile terminal device, the way in which the motor vehicle should behave as soon as it is detected that the mobile terminal device is positioned within the transmitting and receiving area of the NFC control unit which is integrated in the region of the exterior door handle of the motor vehicle. For instance, it can be specified via the mobile terminal device that the trunk should be opened or closed as soon as the mobile terminal device is within the transmitting and receiving area of the NFC control unit. It is also possible, for example, for a navigation system of the motor vehicle to be launched, i.e. started, as soon as the mobile terminal device is within the transmitting and receiving area of the NFC control unit. A user can select essentially any functional units of the motor vehicle and can configure the behavior they are to demonstrate as soon as it is detected that the mobile terminal device is positioned within the transmitting and receiving area of the NFC control unit which is integrated in the region of the exterior door handle of the motor vehicle. Mirror settings, seat adjustments, and the like can also be preconfigured, for example. This is particularly advantageous when different people use one and the same motor vehicle, and each person has his/her own mobile terminal device, which is designed to communicate in the manner described with the motor vehicle in order to control it.

A further advantageous embodiment of the invention provides that as soon as the mobile terminal device is located within the transmitting and receiving area of an additional NFC control unit integrated in the vehicle interior of the motor vehicle, the ignition of the motor vehicle is activated. In other words, it can be provided that the "terminal 15 ON" state is triggered as soon as it is detected that the mobile terminal device has been placed in the vehicle interior within the transmitting and receiving area of the additional NFC control unit. Frequently, a certain amount of time elapses between the time a driver gets into a motor vehicle and the time he starts the engine of the motor vehicle, for example because he must first buckle up, stow items to be carried along, etc. However, if the ignition of the motor vehicle is activated in the meantime, a navigation system can be launched ahead of time, for example, so that ideally it will be available as soon as the driver is ready to enter a destination. The same can apply to any other systems of the motor vehicle.

In a further advantageous embodiment of the invention, it is provided that as soon as the mobile terminal device is located within the transmitting and receiving area of the additional NFC control unit, an electric drive motor of the motor vehicle is activated. In other words, an electric motor that is used to drive the motor vehicle is activated as soon as the mobile terminal device is within the transmitting and receiving area of the additional NFC control unit. Thus, a driver no longer needs to press a start button, for example; rather, it is entirely sufficient for the mobile terminal device to be located within the transmitting and receiving area of the additional NFC control unit. In that case, the motor vehicle is configured such that even though the electric drive motor is activated, the motor vehicle will not automatically drive off on its own. It is also possible for a start release to be issued in response to the placement of the smartphone within the transmitting and receiving area of the additional NFC control unit, in which case the motor, i.e. the electric drive motor of the motor vehicle, will not be started until, e.g., a gear is engaged or an accelerator pedal is activated.

A further advantageous embodiment of the invention provides for the ignition of the motor vehicle to be activated and/or for the electric drive motor of the motor vehicle to be activated as soon as the mobile terminal device has been placed on an inductive charging field in the vehicle interior of the motor vehicle, beneath which the additional NFC control unit is located. Thus, the user will recognize very clearly where he must place his mobile terminal device in the vehicle interior in order to automatically activate the ignition of the motor vehicle and/or to activate the electric drive engine of the motor vehicle automatically without intervention by the driver. The driver's mobile terminal device can be charged automatically via the inductive charging field, and in this position, the mobile terminal device is also automatically positioned close enough to the additional NFC control unit that it is located within the transmitting and receiving area of the additional NFC control unit. NFC technology operates within a frequency range of 13.56 MHz and offers a maximum data transfer rate of 424 kBit/s with a maximum range of 10 cm. In the solution according to the invention, this is also desirable, as it forces the user to deliberately move the mobile terminal device into proximity to the corresponding NFC control units in order to control respective functional units of the motor vehicle.

The control device according to the invention for operating a motor vehicle is designed to change the locking state of the locking system of the motor vehicle as soon as it is detected that a mobile terminal device, which includes an NFC chip and contains a preset code in a memory unit, has been placed in a transmitting and receiving area of an NFC control unit integrated in the region of an exterior door handle of a motor vehicle. Advantageous embodiments of the method according to the invention are to be regarded as advantageous embodiments of the control device according to the invention, said control device having, in particular, means for implementing the method steps.

The motor vehicle according to the invention comprises the control device according to the invention or an advantageous embodiment of the control device according to the invention.

Further advantages, features, and details of the invention will be apparent from the following description of a preferred exemplary embodiment and from the set of drawings. The features and feature combinations mentioned above in the description as well as the features and feature combinations mentioned below in the description of the figures and/or merely shown in the FIGURES may be used not only in the combination specified, but also alone, without thereby departing from the scope of the invention.

BRIEF DESCRIPTION OF THE DRAWING

FIG. 1 shows a schematic diagram of a motor vehicle, in which various vehicle states and a communication between a smartphone and the motor vehicle are depicted in three schematic illustrations of the motor vehicle.

FIG. 1 schematically depicts a motor vehicle 10 in three different states S1, S2, and S3. In state S1, the motor vehicle 10 is locked by means of a locking system not specified here. The vehicle 10 comprises a first NFC control unit 12 in the region of an exterior door handle of the motor vehicle 10, not specified here. The motor vehicle 10 also comprises an additional NFC control unit 14 in the vehicle interior, which may be located, for example, beneath an inductive charging field, not specified here. Further, the motor vehicle 10 comprises a control device 16 for operating the motor vehicle 10. The control device 16 is linked for signal communication to the two NFC control units 12, 14. The control device 16 is also linked for signal communication to the aforementioned locking system of the motor vehicle 10.

In vehicle state S2, NFC communication takes place between a mobile terminal device 18 embodied as a smartphone and the NFC control unit 12 integrated in the region of the exterior door handle of the motor vehicle 10. For this purpose, the mobile terminal device 18 comprises an NFC chip, not shown here in detail, and contains a preset code in a memory unit, likewise not shown here.

A user who wishes to unlock the motor vehicle 10 needs only to move the mobile terminal device 18 into the transmitting and receiving area of the NFC control unit 12, so that communication can take place between the mobile terminal device 18 and the NFC control unit 12. During the course of the communication, the code stored in the memory unit of the mobile terminal device 18 is exchanged. Once the code has been verified, the previously locked motor vehicle 10 is unlocked by a corresponding control of the locking system by means of the control device 16, so that the user in question can get into the motor vehicle 10 without first having to activate a conventional vehicle key. The motor vehicle 10 in the unlocked state S3 is shown schematically on the far right of the sole FIGURE.

For locking and unlocking the motor vehicle 10, it also is not necessary for the user to place his hand on a door handle of the motor vehicle 10, for example, in order to activate communication between the NFC chip of the mobile terminal device 18 and to activate the NFC control unit 12 integrated in the area of the exterior door handle of the motor vehicle 10. The user needs only to bring the mobile terminal device 18 close enough to the NFC control unit 12, in particular closer than 10 cm, to enable communication between the NFC chip of the mobile terminal device 18 and the NFC control unit 12.

It is further possible for the state of additional functional units of the motor vehicle 10, such as a navigation system, a trunk lid, or the like, to be changed according to a selection preconfigured in the mobile terminal device 18 as soon as it is detected that the mobile terminal device 18 is located within the transmitting and receiving area of the NFC control unit 12 integrated into the region of the exterior door handle of the motor vehicle 10. A user can preconfigure a very wide range of functional units of the motor vehicle 10 as he/she desires, using an app installed on the mobile terminal device 18, for example. For instance, the user may specify that the navigation system of the motor vehicle is to be activated and launched as soon as a successful authentication has been performed by means of the mobile terminal device 18, i.e. by a corresponding communication between the NFC chip integrated in the mobile terminal device 18 and the NFC control unit 12. The user can likewise specify, for example, that the trunk lid of the motor vehicle 10 is to be opened automatically every time the motor vehicle 10 is unlocked. Any and all other possible preconfigurations with respect to a very wide range of functional units of the motor vehicle 10 are likewise conceivable.

Furthermore, it is possible for the ignition of the motor vehicle 10 to be activated automatically, i.e., for the "terminal 15 ON" state to be established, as soon as it is detected that the mobile terminal device 18 is located within the transmitting and receiving area of the additional NFC control unit 14 integrated in the vehicle interior of the motor vehicle 10. It can also be provided that the additional NFC control unit 14, as already mentioned, is located beneath an inductive charging field, not shown here, for example. Thus, the user needs only to place his mobile terminal device 18 on the inductive charging field in order to initiate communication between the NFC chip of the mobile terminal device 18 and the additional NFC control unit 14.

If the motor vehicle 10 is a hybrid vehicle or even a purely electric vehicle, it can also be provided that an electric drive motor of the motor vehicle 10 is activated as soon as the mobile terminal device 18 has been placed on the inductive charging field and thus a communication between the NFC chip of the mobile terminal device 18 and the additional NFC control unit 14 is enabled.

The invention claimed is:

1. A method for operating a motor vehicle, comprising:
a locking state of a locking system of the motor vehicle is changed as soon as it is detected that a mobile terminal device that includes an NFC chip and contains a preset code in a memory unit is located within a transmitting and receiving area of an NFC control unit integrated in the motor vehicle, and as soon as the mobile terminal device is located within the transmitting and receiving area of an additional NFC control unit integrated in a vehicle interior of the motor vehicle, an ignition of the motor vehicle is activated, wherein as soon as the mobile terminal device is located within a transmitting and receiving area of the additional NFC control unit, an electric drive motor of the motor vehicle is activated without a driver of the motor vehicle needing to press a start button.

2. The method according to claim 1, wherein a state of at least one additional functional unit of the motor vehicle is changed according to a selection preconfigured in the mobile terminal device as soon as it is detected that the mobile terminal device is located within the transmitting and receiving area of the NFC control unit.

3. The method according to claim 1, wherein the ignition of the motor vehicle is activated and/or the electric drive motor of the motor vehicle is activated as soon as the mobile terminal device has been placed on an inductive charging field in the vehicle interior of the motor vehicle, beneath which the additional NFC control unit is located.

4. A control device for operating a motor vehicle, comprising:
a locking system changing a locking state of the motor vehicle as soon as it is detected that a mobile terminal device that includes an NFC chip and contains a preset code in a memory unit is located within a transmitting and receiving area of an NFC control unit integrated in the motor vehicle, wherein the control device activates an ignition of the motor vehicle as soon as the mobile terminal device is located within a transmitting and receiving area of an additional NFC control unit integrated in the vehicle interior of the motor vehicle, wherein the control device activates an electric drive motor of the motor vehicle without a driver of the motor vehicle needing to press a start button, as soon as the mobile terminal device is located within the transmitting and receiving area of the additional NFC control unit.

* * * * *